United States Patent Office 3,435,905
Patented Apr. 1, 1969

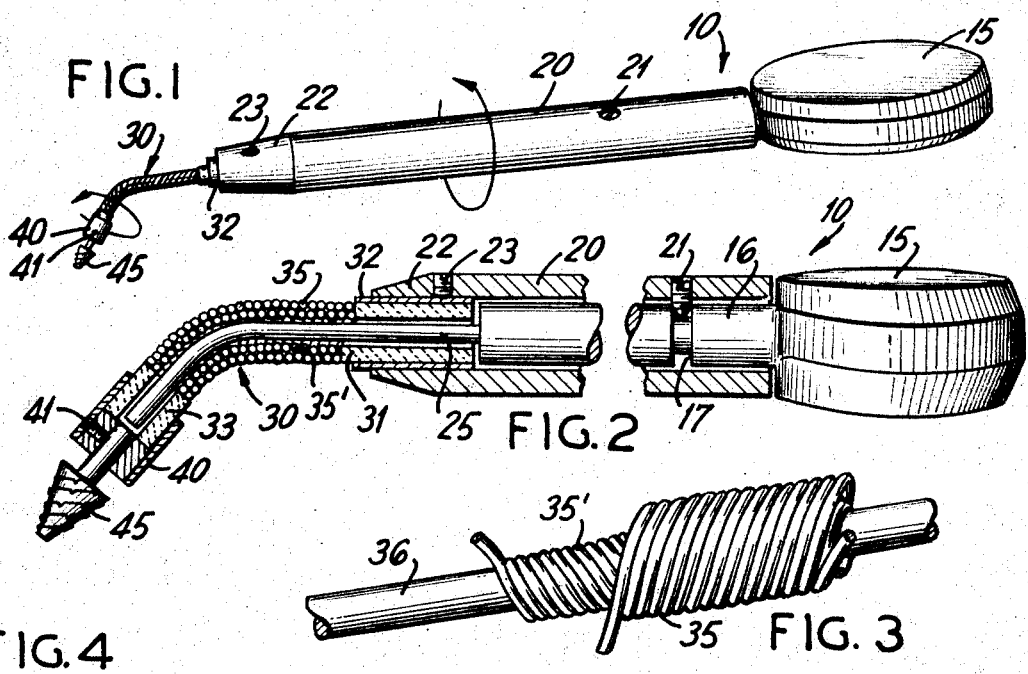

3,435,905
TOOL AND METHOD OF MANUFACTURING THE SAME
Harry J. Lazarus, Teaneck, N.J., assignor to Lazarus and Peyser Associates, Teaneck, N.J., a limited partnership
Filed Mar. 29, 1966, Ser. No. 538,397
Int. Cl. A61c *1/02, 3/02*
U.S. Cl. 173—163          12 Claims

ABSTRACT OF THE DISCLOSURE

An angle drive tool includes a stationary guide having a bendable outer end portion and a bearing portion and a driving member rotatable on the bearing portion. A flexible sleeve laterally surrounds the bendable outer end portion of the stationary guide and is connected to the driving member. This sleeve extends longitudinally around any bends in the outer end portion of the guide. Tool mounting means are secured to the other end of the flexible sleeve. A palm grip is secured to the bearing portion of the guide and projects outwardly beyond the driving member.

---

This invention relates to tools and their manufacture and, more particularly, to a new and useful hand or manually operable tool by means of which a chuck or the like may be rotated through a novel drive means at any desired angle, and to a method of manufacturing such tool.

Various means have been proposed and used for effecting rotation of a driven element about an axis which extends at an angle to the axis of a driving element connected to the driven element. Many of these tools include what are known as "flexible shafts." The usual form of flexible shaft comprises a non-rotatable sleeve anchored at both ends against rotation, and enclosing a flexible wire or the like which serves to transmit torque from a driving element to a driven element and which is maintained against whipping and in a condition to transmit such torque by virtue of relatively close engagement with its enclosing sleeve. Generally speaking, such flexible shafts hitherto have been used in connection with power-driven and hand-driven elements, for example, the speedometers of cars and the like.

There are several known types of flexible shafting. One type comprises a flexible wire or the like disposed within a flexible sleeve. Another type, which is superior to the first type, is made of various numbers of windings around a core which is secured at each end to the windings. However, even this latter flexible shafting has several limitations. Due to its solid core, it cannot form a relatively sharp angle without causing permanent kinking at the bend, whereby its use is limited to instances where the schafting can be bent along a relatively gradual curve or arc. This is a disadvantage in that it inhibits this type of flexible shafting from many uses, particularly in confined work areas where sharp bends are required.

A particular limitation of the mentioned flexible shafting is when it is desired to use the same with a manually-driven tool which must be held at its free end to obtain a desired angle of arc while rotating the driving end with the other hand. The two ends of the flexible shafting must be restrained in order to maintain the angle of bend, and unless they are restrained mechanically, the two hands must be used to hold the flexible shaft being bent at the desired angle. One hand provides the driving force, and the other hand prevents rotation of the entire tool when torque is applied thereto.

This limitation to two-hand operation is impractical in many uses, particularly in denistry, and makes it practically impossible to use flexible shafting of this type bent in tools used for denistry as the space limitations in the mouth prohibit the use of the two hands to hold the shafting bent at a desired angle. Additionally, as this type of shafting can be bent through only a large arc or curve, there is no room for the same to be used in the mouth due to the space limitation.

This disadvantage is particularly apparent in the case of a dental matrix coil in which the coil is not rigidly part of the matrix but instead is very flexible and will twist while being wound by a winding tool if the tool did not function as a one-hand operable tool with built-in means that would prevent twisting while still providing the required abrupt, nearly right-angle, drive of the tool in winding up of the matrix coil.

In accordance with the present invention, a relatively small one-hand operated tool is provided by means of which a driven element may have torque applied thereto to rotate about an axis which extends at an angle to a driving element, this being effected through the provision, among other means, of a novel driving means operable through any selected angle. More particularly, the driving means of the tool in accordance with the present invention comprises a coreless flexible driving sleeve which is rotated by the application of torque to one end thereof, and rotates a chuck or the like secured to the other end thereof. A stationary guide, such as a spindle or stem, which is relatively stiff but has sufficient malleability to be bent at an angle, extends through thls coreless driving sleeve with clearance with the latter except at bends of the driving sleeve. The inner spindle or guide stem can be bent to any predetermined angle, or may be bent to several angles, readily and easily, depending upon the particular environment in which the tool is to be used. Nevertheless, it has been found that, with the invention arrangement, it is possible, in spite of the angle at which the stem is bent, to effect a smooth rotation of a chuck and a tool element connected to the chuck while maintaining the axis of the chuck at a predetermined angle to the axis of rotation of a manual driving member such as a sleeve. A hand grip is fixedly secured to one end of the guide stem to hold the stem stationary, while the coreless flexible drive sleeve is rotated by means of a manually relatively rigid driving member secured to the driving end of the sleeve and disposed immediately adjacent the manual gripping element.

More particularly, in accordance with the invention the tool comprises a manual gripping member from which there extends fixedly a relatively elongated and relatively large diameter bearing and guide member having extending from its free end a relatively small diameter stem of a relatively stiff but malleable metal and which may be bent at a desired angle. A sleeve-form driving member is rotatably mounted on the bearing member and secured against axial displacement therealong. This operating member extends beyond the bearing member and has its extending end anchored, by a set screw or the like, to a collar secured to one end of the coreless flexible driving sleeve. A collar is secured to the other end of the coreless flexible driving sleeve and a suitable chuck is anchored to this collar. The malleable but stiff stem extends into the second collar to which the chuck is attached. Any desired tool may be anchored in the chuck so as to be rotated by rotation of the manual operating member. The stem may be bent to any desired angle so that the axis of the chuck may be located at any previous selected angle with respect to the axis of rotation of the driving member.

A feature of the invention is that the flexible shaft resilient sleeve comprises a pair of oppositely wound, coaxially telescoped, helical springs. The springs are wound in such a manner that, when a clockwise rotation is imparted to the flexible sleeve, as viewed from the driving end thereof, the outer spring tends to wind up and the inner spring tends to unwind. Thus, the outer sleeve tends to contract diametrically and the inner spring tends to expand diametrically. As a result, the two springs exert pressure on each other in accordance with the torque being transmitted. Thus, the driving torque is transmitted from the driving member to the chuck, with the axial direction of the driven torque being determined by the angle to which the stationary stem is bent. On the other hand, when the flexible shaft is rotated in the opposite direction, or counterclockwise, the inner spring tends to contract diametrically and the outer spring tends to expand diametrically, so that the amount of torque that can be transmitted upon rotation of the driving member in a counterclockwise direction is somewhat limited, thus limiting the force which can be exerted. For a strong counterclockwise transmission of force or torque, the windings of the flexible sleeve are relatively reversed in that the sleeve is wound with the right lay over the left lay. For dual purpose tools, in which torque is to be transmitted either clockwise or counterclockwise, two flexible sleeves are provided, wound in respective opposite directions. These two sleeves can be interchangeably connected into the tool as desired in accordance with the particular desired rotational direction of the tool.

A feature of the invention tool is that its finds particular applicability in dental work for use as a tool, for example, for tightening band elements for dental filling work. Such band elements are arranged in the form of a loop surrounding the tooth, and the loop may be tightened by winding up a projecting end of the band in one direction. For this purpose, a novel conical helical winding member is secured in the chuck of the tool and is arranged to engage and grip inside a partially pre-formed coil for the purpose of fully winding the coil for the end result of tightening the band on the tooth. To wind the band, the manual operating member of the tool is rotated in a clockwise direction. Only a slight amount of rotation in the counterclockwise direction is necessary to loosen or disengage the tightening tool from the band element. By virtue of the malleable but relatively stiff stem, the conical coil winding member may be arranged to rotate about an axis at any desired angle to the driving axis of the manually rotatable driving member, thereby greatly facilitating proper positioning of the tool in the mouth of the patient. A substantially unlimited amount of torque may be exerted by rotating the manual operating member in the clockwise direction, and only a minute amount of torque is necessary, in the counterclockwise direction, to loosen and disengage the winding member from the band. The enlarged grip on the driving end of the tool is useful in that it enables a tool to be held steady and prevent clockwise rotation of the entire tool instead of rotation of the winding member alone. The grip is held in the palm of the same hand that is rotating the manual operating member. Thus, the tool may be termed a one-hand operated unit.

In accordance with a preferred method of constructing the tool, a number of flexible shafts may be formed at the same time. For this purpose, lengths of spring wire are wound on a mandrel made of aluminum or other similar material. The inner layer is wound with a "right lay" and the outer layer is wound with a "left lay." The windings of the spring wire may be of any desired continuous length. The respective desired finish lengths are spaced axially from each other by bands of solder approximately 3/8" wide in axial dimension. These bands are formed of solder having a composition such that it will bond or adhere to the material of the spring wires, when the latter are made of metal, but will not bond to the mandrel. If the spring wires are made of a material other than metal, such as synthetic resin, a suitable adhesive or the like may be used to replace the solder. In either event, this provides a continuous length of two-layer spring wire, with the two layers being wound in respective opposite directions and with the individual flexible sleeves demarcated by the bands of solder or the like.

After the soldering is completed, the continuous length of flexible sleeve is severed intermediate the axially opposite ends of each of the intermediate solder bands to provide several complete flexible sleeves held for unwinding by the solder on each of its ends. Then the mandrel is withdrawn from the individual flexible sleeves as the soldering does not effect a bond between the mandrel and the spiral spring. The bond is between both layers of the spiral spring only. Thus, the removal of the mandrel provides coreless flexible sleeves.

In assembling a tool, the rotatable operating member is mounted over the enlarged portion of the guide member on stem and anchored against axial displacement thereon by virtue of a set screw which engages in a circumferential groove in such enlarged portion. A collar is slipped over the solder band at one end of a flexible sleeve after the band has been smoothed, and may be brazed or soldered to the band. A second collar is similarly secured to the previously smoothed solder band at the other end of the flexible sleeve. The flexible sleeve is then slipped over the malleable small diameter stem and one collar is anchored to the driving member, again by means of a set screw or the like. The other collar has the chuck anchored thereto, or the chuck may form an integral part of the otther collar. Any suitable tool may then be disengageably mounted in the chuck. The assembly of the sleeve with the tools is effected with the stem of the tool extending rectilinearly, and it is only after this assembly has been completed that the bendale stem extending through the coreless flexible sleeve may be bent. The disposition of parts is such that the free end of the bendable stem has a clearance with the shank of a tool inserted into the chuck.

Accordingly, an object of the present invention is to provide an improved drive means for transmitting torque through an angle, comprising a flexible sleeve having a fixed guiding stem extending freely therethrough.

Another object of the invention is to provide a hand tool, such as a rotary drill or the like, including a guiding element having a manual grip and an outer end bent at a desired tool operating angle, and further including a rotatable driving member which is manually operated and to which is secured a bendable drive means including a flexible sleeve and having means for mounting a tool on the end thereof.

A further object of the invention is to provide a hand tool, such as just mentioned, in which the resilient sleeve means includes a pair of coaxially telescoped, oppositely wound, helical hprings extending between the driving element of the tool and the chuck or other type of tool mounting element.

Yet another object of the invention is to provide a rotation providing tool, such as just mentioned, including a stem of stiff but malleable material extending through the resilient sleeve with clearance and bendable to set the drive angle.

A further object of the invention is to provide a tool which is simple in design, rugged in construction and economical to manufacture.

Yet, an additional object of the invention is to provide a tool such as described above, and having a gripping end which fits into the palm of the hand and is thus grasped fast, thereby preventing complete rotation of the entire tool when the rotatable driving member is rotated by the thumb and a finger of this hand, thus permitting one hand operation. Thus, only the sleeve, the chuck and the tool or winding member rotate, while the bendable stem which is connected to the palm grip is held stationary and thus in the desired position and at the angle of desired operation.

For an understanding of the principles of the invention, reference is made to the following description of a typical embodiment thereof as illustrated in the accompanying drawings.

In the drawings:

FIG. 1 is a perspective view of a tool embodying the invention;

FIG. 2 is a side elevation view, partly in section, of the tool shown in FIG. 1;

FIG. 3 is a perspective view illustrating one step in the method of manufacturing the tools of FIGS. 1 and 2;

FIGS. 4 and 5 are, respectively, a side elevation view and a perspective view, illustrating further steps in the manufacture and assembly of the tool;

FIG. 6 is a greatly enlarged diametric sectional view through the flexible sleeve of the invention;

FIG. 7 is a perspective view illustrating the assembly of the flexible sleeve to the driving member and palm grip, the position of the flexible shaft during assembly being shown in full lines and the dotted lines indicating how the flexible shaft may be bent to a desired orientation of the drive axis only after complete assembly of the tool; and FIG. 8 is a view similar to FIG. 7 illustrating a further possible orientation of the flexible sleeve after assembly of the tool as illustrated in FIG. 7.

Referring generally to the drawings, the novel tool of the invention includes a handle assembly generally indicated at 10, an operating member 20 which is rotatably mounted on the handle assembly and a flexible coreless sleeve, generally indicated at 30, which is secured to member 20 to be rotated thereby to drive a chuck 40 which is arranged to interchangeably receive tools such as the conical helical winding member 45.

As best seen in FIG. 2, handle assembly 10 includes a relatively large grip 15 which may be circular in plan and of some thickness. Grip 15 may be made of suitable metal, such as "Monel" metal or the like, and is arranged to be easily gripped in the palm of one using the tool. A relatively large diameter bearing member 16 extends radially from grip 15 and rotatably mounts tubular operating member 20. The relative lengths of bearing member 16 and operating member 20 are such that member 20 extends somewhat beyond the outer end of bearing member 16.

A relatively stiff yet malleable stem 25 extends coaxially from the outer end of bearing member 16. Stem 25 forms part of the flexible sleeve 30 and may be a semi-rigid stainless steel shaft having a diameter, for example, of .045 inch. The parts 15, 16 and 25 may be formed integral with each other, may be welded or brazed to each other, or may be held in a fixed relation by a mechanical means such as set screws or the like.

Bearing member 16 is formed with a circumferential groove 17 at a short distance from grip 15. Groove 17 has engaged therein the inner end of a set screw 21 threaded into a suitable aperture in member 20. Set screw 21 maintains member 20 against axial displacement relative to bearing member 16 while permitting rotation of member 20 on bearing member 16.

Flexible sleeve 30 includes a pair of helical springs 35, 35' which are coaxially telescoped and oppositely wound. Helical springs 35, 35' are formed of suitable stainless steel or other suitably flexible materials such as, for example, "Monel" metal, synthetic resin, etc. Outer spring 35 is wound with a "left lay," and inner spring 35' is wound with a "right lay" as best seen in FIG. 3. Furthermore, inner spring 35' has a clearance with stem 25, as best seen in FIG. 6. This clearance exists throughout the length of the flexible sleeve when the latter is not bent, However, when the flexible sleeve 30 is bent at an angle, as illustrated in several figures of the drawings, the inner spring 35' will engage the stem 25 at the bends in the latter, and this performs an important feature as will be described hereinafter. In a manner described more fully hereinafter, the inner ends of springs 35 and 35' are united by solder band 31 which has soldered or brazed thereto, in embracing relation, a collar 32. The outer ends of springs 35 and 35' are united by a second solder band 33 which has secured thereto, as by soldering or the like, the sleeve portion of a chuck 40 which embraces solder band 33 to extend at least partially thereover and is soldered or brazed to band 33.

Driving member 20 has a conically tapered end 22, and is telescoped over sleeve 32. A set screw 23 threaded through a suitable aperture in member 20 anchors member 20 to collar 32 and thus to flexible sleeve 30, so that flexible sleeve 30 is rotated when operating member 20 is rotated. The outer surface of member 20 may be knurled, if desired, or may be left smooth so that it may slip in the dentist's fingers. Thus, the gripping capability of member 20 will be limited in the dentist's fingers, where limitations of torque application on driving member 20 may be desirable for the comfort of a patient.

The method of making the flexible sleeve is best illustrated in FIGS. 3 through 7. Preferably, a plurality of flexible sleeves is formed simultaneously. This is done by forming continuous lengths of helically wound spring wire, 35 and 35', over an aluminum mandrel 36. As stated, inner wire 35' is wound with a "right lay" so that it will tend to unwind or expand radially upon clockwise rotation of operating member 20, whereas outer wire 35 is wound with a "left lay" so that it will tend to wind up or contract radially upon such clockwise rotation of operating member 20. However, if it is desired that the maximum torque be transmitted in a counterclockwise direction, then the inner sleeve 35' is wound with a "left lay" and the outer spring is wound with a "right lay."

The continuous length of spring wire to form the springs 35' is first wound around aluminum mandrel 36, as illustrated in FIG. 3, and then the continuous helical wire to form the springs 35 is wound around the wire forming the springs 35'. This forms a continuous length of two layer wound spring wires having an overall length which is multiple of a number of individual flexible sleeves herein described.

The two continuous lengths of wire, one wound over the other, are then united together at their extreme ends by applying bands of solder to these extreme ends. Intermediate bands of solder, which have an axial width twice that of the end bands, are then applied at locations corresponding to the adjoining ends of the desired separate sleeves, as indicated at 37. The solder is of such a nature that it will bond or adhere to the material of the spring wires 35 and 35', which are preferably stainless steel, but will not adhere to the aluminum mandrel 36. Consequently, after all of the solder bands 33, 37 have been completed, uniting the inner and outer springs to each other at selected locations, the double length solder bands 37 are severed intermediate their ends, such as along the lines indicated at 38. Then mandrel 36, which has also been severed, may be withdrawn from the resultant series of flexible sleeves. This will leave each section as an individual coreless flexible shaft including an outer helical spring 35, an inner helical spring 35', and solder bands 31 and 33 interconnecting the inner and outer spring wires at their opposite ends. Solder band 31 is then smoothed and a collar 32 is slipped thereover and bonded to band 31 as by soldering or brazing. Similarly, the sleeve portion of a chuck 40 is slipped over the solder band 33, which has likewise been smoothed, and is soldered or brazed to the band 33.

Unwinding of the two helical springs 35, 35' is resisted by the solder bands 31 and 33 which unite respective opposite ends of the two springs. Thus, if one spring tries to unwind, such unwinding is resisted by the other spring which tends to wind, and vice versa. This is an important feature of the coreless flexible sleeve 30 of the invention.

After this, the parts are assembled with stem 25 extending rectilinearly in axial alignment with the axis of enlarged portion 16 and without any bands therein. Operating member 20 is slipped over bearing portion 16 and anchored against relative axial displacement by means of set screw 21 engaging in annular groove 17. The assembled coreless flexible sleeve is then slipped over the straight stem 25, and collar 32 is anchored to sleeve 20 by means of set screw 23. It will be noted that stem 25 extends nearly through band 33 but terminates somewhat short of the axially outer end thereof. The tool must be assembled without the stem 25 being bent, and it is only after assembly is completed that the stem can be bent to the desired drive angle. The tool is now ready for use.

The described tool is designed for one handed operation. In using the tool, the operator grasps the grip 15 in the palm of one hand, and rotates the sleeve 20 clockwise with the thumb and forefinger of the same hand to effect a driving action of the tool. Previous to this, the angle of drive may be set by bending the flexible sleeve to bend the stem 25. Such bending may be at any desired angle, such as the bend indicated in dotted lines in FIG. 7. Furthermore, and as indicated in FIG. 8, the flexible sleeve may be bent at more than one point to obtain access to a particular work location.

In known flexible shafting, the spring nature of the shafting will not permit presetting and retention of any preset angle and holding at any preset angle. Due to the separate semi-malleable core 25, presetting is possible with the flexible drive of the present invention. It should be noted that known types of flexible shafting would immediately straighten out, particularly when rotation is imparted thereto, unless suitably restrained at the driven end. Thus, if known flexible shafting is not held bent with the other hand or some other separate means, it will not retain its bend, nor can it be bent at an abrupt angle as with coreless flexible sleeve 30. Such use of the two hands to retain a bend in a flexible shaft type of tool is not always possible in certain circumstances, such as in dentistry where there is no space in the patient's mouth for a second hand to work, and where the angle must be preset before entry of the tool into the mouth.

A further feature of the invention is the conical helical winding member 45 having helically extending ratchet teeth, and which particularly adapts the tool of the present invention for use in dental work, such as in the tightening of stainless steel bands around teeth to form matrices. When this conical winding member is engaged with the inside of the bore of a pre-formed coil of such a band, and particularly with the band of the type shown in my copending application Ser. No. 550,189, now Patent No. 3,411,214, filed on May 16, 1966 for Dental Appliance, the teeth of the winding member will engage in the notch of the band coil and will tighten the band about the winding member. This is due to the fact that the teeth of the winding member are spiral in design and are cut at such a unidirectional angle as to engage the notch only when the winding member is rotated clockwise. The winding member will disengage from the notch when the latter is rotated counterclockwise, due to the ratchet or saw-tooth design of the teeth. The winding member may be readily released from the wound-up band by merely reversing the direction of rotation of member 20.

When member 20 is rotated in a clockwise direction, outer spring 35 tends to wind-up or contract radially and inner spring 35' tends to unwind or expand radially. This forces the two springs 35 and 35' into firm engagement to provide for transmission of torque from member 20 to the tool 45. Upon rotation of member 20 in a counterclockwise direction, outer sleeve 35 tends to unwind and inner sleeve 35' tends to wind. This results very soon in disengagement of the two sleeves so that it is possible to transmit only a limited amount of torque. Such torque limitation is desirable when the tool is used as a dental tool where no torque is required in counterclockwise rotation, as for the purpose of disengaging the tool from the dental appliance such as a matrix or band.

The grip 15 has an important function in that it prevents the entire tool from rotating when driving member 20 is rotated. The grip 15, held in the palm of the operator, holds the tool in its directed position while member 20 is rotated to, in turn, rotate flexible shaft 30, chuck 40 and winding member 45 as desired, with the drive being at any desired angle.

In the operation of the tool, the clearance, such as indicated in FIG. 6, is essential for proper operation as is also the resistance afforded by engagement with the flexible shaft of the stem 25 at bends in the flexible shaft. Such resistance assists or enables the action of the tool when used in connection with dental appliances that have spring-back action of their own. This resistance to the rotation of the tool inhibits the spring-back of the dental appliance, thus permitting full winding and tightening of the dental appliance such as a band.

The truncated conical shape of winding member 45 is also of importance as it assures contact inside a coil of a dental band even if the coil is somewhat too large. In such a case, winding member 45 just seats more deeply until the wider part of the winding member engages ridges of the coil or band.

As stated, the tool of the invention is particularly important in winding dental appliances, such as matrix bands. Due to the conical winding member and the presetting at any desired angle of drive, which is one of the characteristics of the present invention, tightening of the matrix is readily effected with the winding member being easily removable when the tightening is completed.

It should be understood, however, that the invention is not limited to a dental tool but may be used to drive any type of tool. For example, the tool may be used with a screwdriver blade, a socket wrench, or any other such tool anchored in the chuck 40 by means of the set screw 41.

For heavy duty work, other than dentistry, the tool can be strengthened to enable transmission of greater torque by adding more pairs of windings to the coreless flexible sleeve. Each pair of windings, of course, will constitute in itself a flexible sleeve. The pairs must match each other. Namely, for clockwise rotation each pair should be wound over the mandrel in matching multiples of two, the windings of each pair being wound left lay or right lay as previously described. The multiples may be in even groups of 2, 4 or 6 windings. Odd numbers of windings of the spring wire, such as 1, 3, 5 etc. would not function as a coreless flexible sleeve. Thus, regardless of whether it is right lay over left lay or left lay over right lay, the tool would operate inefficiently with an odd number of windings as, when turned in one direction, the sleeves would bind against the stem and prevent rotation of the coreless flexible sleeve. When rotated in the opposite direction, the coreless flexible sleeve would act in a spring-like nature, thus not transmitting the desired torque. The operator thus would be merely winding the spring-like flexible sleeve, that will spring back, losing the value of any useful result of any rotation of the tool. The non-springback and the non-binding features of the coreless flexible sleeve of the invention, when formed in identical pairs of multiples of two windings, would transmit the torque. However, it would not transmit the torque when an odd number of windings are used, for the reasons mentioned above.

While specific embodiments of the invention have been shown and described in detail to illustrate the application of the principles of the invention, it will be understood that the invention may be embodied otherwise without departing from such principles.

What is claimed is:

1. An angle drive tool comprising, in combination, a stationary guide having a bendable outer end portion and a bearing portion; a driving member rotatable on said bearing portion; a driving means connected at one end to said driving member and including a flexible sleeve laterally surrounding, and extending longitudinally around the bends in, said outer end portion of said guide; and tool mounting means secured to the other end of said flexible sleeve for rotation by said driving member through said flexible sleeve.

2. An angle drive tool, as claimed in claim 1, including a manual grip fixed to said bearing portion and projecting outwardly beyond said driving member.

3. An angle drive tool, as claimed in claim 1, in which said driving member comprises a relatively elongated tubular member embracing said bearing portion.

4. An angle drive tool, as claimed in claim 2, in which said manual grip comprises a substantially flat cylindrical disc arranged for easy gripping in the palm of an operator.

5. An angle drive tool, as claimed in claim 1, in which said flexible sleeve comprises at least one pair of coaxially telescoped helical springs each anchored at one end to said driving member and at the other end to said tool mounting means.

6. An angle drive tool, as claimed in claim 5, in which the helical springs of each pair are wound in respective opposed directions.

7. An angle drive tool, as claimed in claim 6, in which said stationary guide includes a relatively large diameter cylindrical cross section bearing portion and a relatively small diameter cylindrical cross section stem constituting said outer end portion; said stem having a diameter such that, when said flexible sleeve extends rectilinearly, there is a clearance between the outer surface of said stem and the inner surface of the inner helical spring.

8. An angle drive tool, as claimed in claim 7, in which said flexible sleeve includes a pair of axially spaced collars, one at each end thereof; corresponding first ends of said helical springs being soldered to one of said collars and corresponding second ends of said helical springs being soldered to the other of said collars.

9. An angle drive tool, as claimed in claim 6, in which the outer helical spring is wound in a direction such as to be wound-up and radially contracted upon rotation of said driving member in a clockwise direction as viewed looking toward said tool mounting means, whereby the inner helical spring will tend to unwind and expand radially during such clockwise rotation of said driving member to effect firm pressure engagement between the inner and outer helical springs; the outer helical spring, upon counterclockwise rotation of said driving member, tending to expand and the inner helical spring to contract.

10. An angle drive tool, as claimed in claim 5, wherein said stationary guide is a bendable stem having a diameter such that the inner spring of the flexible sleeve brushes lightly against said stem at bends in said flexible sleeve, said brushing offering a desirable resistance to springback when the tool is used in connection with material that is spring-like in nature.

11. An angle drive tool comprising, in combination, a stationary guide member having a relatively elongated bearing portion and a bendable stem extending from said bearing portion; a relatively elongated tubular driving member rotatably mounted on said bearing portion; a flexible sleeve connected at one end to said driving member and surrounding, and extending around the bends in, said bendable stem of said guide member; tool mounting means secured to the other end of said flexible sleeve for rotation by said driving member through said flexible sleeve; and a manual grip rigidly secured to said bearing portion; said manual grip comprising a substantially flat cylindrical disk arranged to be held in the palm of one hand whereby the thumb and the finger of the same hand may be used to rotate said driving member to rotate said tool mounting means while the relative orientation of the tool is maintained by the operator's grasp upon said manual grip; said stem being bendable to set, at any desirable angle, the drive angle of said tool mounting means and the proper drive angle being maintained by the operator's grasp of said manual grip, whereby said tool may be operated with one hand in such locations where it is difficult, if not impossible, for the operator to use two hands to maintain the correct drive angle.

12. An angle drive tool, as claimed in claim 8, in which said stem extends at least partially into the collar on the axial outer end of said sleeve but terminates short of the axially outer end of said last-named collar.

References Cited

UNITED STATES PATENTS

| 1,346,893 | 7/1920 | Jackson | 173—163 X |
| 2,390,646 | 12/1945 | Hays | 173—163 X |
| 2,430,817 | 11/1947 | Jackson | 173—163 |
| 3,219,129 | 11/1965 | Yamada | 173—30 |

NILE C. BYERS, JR., *Primary Examiner.*